UNITED STATES PATENT OFFICE.

CARL OSKAR MÜLLER, OF BASLE, SWITZERLAND, ASSIGNOR TO BASLE CHEMICAL WORKS BINDSCHEDLER.

BLUE TETRAZO DYE.

SPECIFICATION forming part of Letters Patent No. 524,070, dated August 7, 1894.

Application filed April 5, 1894. Serial No. 506,384. (Specimens.)

*To all whom it may concern:*

Be it known that I, CARL OSKAR MÜLLER, a subject of the German Emperor, residing at Basle, Switzerland, have invented certain new and useful Improvements in the Manufacture of Tetrazoic Coloring-Matters, of which the following is a specification.

This invention relates to the manufacture of a new blue tetrazoic coloring matter derived from a new dioxynaphthoic monosulfoacid obtained by the fusion of the alphaoxynaphthoic-disulfo-acid (OH.COOH.SO$_3$H.SO$_3$ H=1.2.4.7) with caustic alkalies, at a temperature of 180° to 200° centigrade.

In a pending application, Serial No. 506,383, I have described a method of producing tetrazoic coloring matters, but I do not herein claim the method and product therein described.

These new coloring matters dye unmordanted cotton, in an alkaline bath, and are obtained by the combination of one molecule of the said dioxynaphthoic-mono-sulfo acid with one molecule of the tetrazo derivative of an aromatic paradiamido compound, such for example as tetrazodiphenyl and its homologues, tetrazo-oxydiphenyl-alkylethers, tetrazodioxy-diphenyl-alkylethers, tetrazo-stilbene and tetrazo azobenzene and its homologues, and the subsequent combination of the intermediate product thus obtained with one molecule of a sulfo derivative of a naphtholic compound, such for instance as alpha- and beta-naphtholsulfoacids, oxynaphtholsulfoacids (dioxy-naphthalene sulfoacids), amidonaphthol-sulfoacids and carboxyl-oxy-naphthol-sulfoacids (dioxynaphthoic-sulfoacids).

*Production of the new dioxynaphthoic-mono-sulfoacid.*—Fifty kilos of the sodic salt of the alpha-oxy-naphthoic disulfo-acid (1.2.4.7) are melted with two hundred kilos of caustic soda or caustic potash for a few hours at a temperature of 180° to 200° centigrade. The melted mass is then dissolved in water and neutralized by a mineral acid. The new dioxy-naphthoic-mono-sulfo-acid forms a white precipitate.

By way of example, I will describe specifically the method employed for obtaining two of the new coloring matters derived from this new dioxynaphthoic-monosulfo-acid.

I. *A coloring matter obtained by the combination of one molecule of the tetrazo derivative from dianisidin with two molecules of the new dioxy-naphthoic mono-sulfoacid.*—Twenty-four kilos of dianisidin (diamido-dioxy-diphenyl-methylether) dissolved with fifty-two kilos of concentrated hydrochloric acid and two hundred and fifty litres of water are diazotised with a solution of fourteen kilos of sodium nitrite in fifty kilos of water. The liquor containing the tetrazo compound is then poured into a solution of twenty kilos of sodium carbonate and of thirty-five kilos of the sodic salt of the new dioxynaphthoic mono-sulfo-acid, made as above described. After stirring the liquor for some time, all the tetrazo compound is transformed into an intermediate combination. A second quantity of the solution of the new dioxy-naphthoic mono-sulfoacid, the same as at first, is then added. When the combination is terminated, the temperature of the liquor is raised by heat—preferably by steam heat—to about 100° centigrade. The coloring matter is then filtered and dried. The new color dyes unmordanted cotton a fast greenish blue.

When dried, this new coloring matter constitutes a brown powder with metallic luster readily soluble in water with a blue coloration and in concentrated sulfuric acid with a greenish blue coloration.

In the above mentioned example, for the tetrazo derivative of dianisidin can be substituted tetrazodiphenyl and its homologues, ethers of tetrazooxydiphenyl, tetrazo-stilbene, tetrazo-azobenzene and its homologues and, for the second molecule of the dioxynaphthoic monosulfoacid, can be substituted an equivalent quantity of an analogous derivative of naphthol also furnishing coloring matter, as, for instance the various naphthol-sulfo-acids, oxynaphthol-sulfo-acids and amidonaphthol-sulfo acids, and thus the tint of the coloring matter can be varied at will.

One molecule of the following bodies can thus be combined with the intermediate product of one molecule of a tetrazo body and one molecule of the new dioxynaphthoic mono-sulfo acid: (*a*) monosulfo acid of the alpha-naphthol (alpha 1—alpha 2); (*b*) monosulfo acid of the beta-naphthol (Schaeffer); (*c*) monosulfo acid of the beta-naphthol (F); (*d*)

disulfo acid of the beta-naphthol (R); (e) disulfo acid of the beta-naphthol (F); (f) dioxynaphthalene monosulfo acids obtained by alkaline fusion of the naphthol disulfo acids R and G of the German Patent No. 3,229, or of the naphtholdisulfo acid E of the German Patent No. 45,776, or of the betanaphthol-disulfo-acid F, of the German Patent No. 44,070; (g) dioxynaphthalene-mono-sulfo-acid (1.7.4); (h) mono- and disulfo-acids of the amido-naphthol (alpha 1—alpha 4); (i) mono- and disulfo acids of the dioxy-naphthalene (alpha 1—alpha 4); (j) dioxynaphthoic sulfo acid of the German Patent No. 67,000; (k) beta-amidonaphthol gamma-sulfo-acid.

II. *A coloring matter obtained by the combination of one molecule of the tetrazo derivative of tolidin with one molecule of the new dioxynaphthoic-mono-sulfo-acid and one molecule of the naphthol-sulfo-acid alpha 1—alpha 2.*—Twenty-four kilos tolidin, dissolved in five hundred liters of water and fifty-five kilos of concentrated hydrochloric acid, are diazotised at a temperature of about 5° centigrade with a solution of fourteen kilos of sodium nitrite. When the tetrazo compound is formed, the liquor is run into a solution of thirty-five kilos of dioxynaphthoic mono-sulfo acid and twenty kilos of soda ash. After the formation of the intermediate compound twenty-five kilos of the sodic salt of the naphthol sulfo acid alpha 1—alpha 2 are added. The formation of the coloring matter is completed in twenty-four to forty-eight hours. The liquor is then heated by steam and the dye stuff is precipitated by salt, filtered and dried. It dyes unmordanted cotton a violet-blue.

This coloring matter constitutes, when dried, a brown powder with metallic luster, readily soluble in water with a blue-violet coloration and in concentrated sulfuric acid with a greenish-blue coloration.

Having thus described my invention, I claim—

1. The herein described improvement in the manufacture of coloring matters, which consists, first, in the fusion of alpha-oxynaphthoic-disulfoacid ($OH.COOH.SO_3H.SO_3H=1.2.4.7$) with caustic alkali at a temperature of 180° to 200° centigrade, and second, the separation from the mass of the resultant dioxynaphthoic-mono-sulfo-acid, substantially as described.

2. The herein described improvement in the manufacture of coloring matters, which consists in producing intermediate products, containing one free diazo group, by the combination of one molecule of the dioxy-naphthoic-monosulfo-acid derived from alpha oxynaphthoic-disulfo-acid ($OH.COOH.SO_3H.SO_3H=1.2.4.7$) with one molecule of the tetrazo-derivative of an aromatic para-diamido-compound, such, for instance, as tetrazodiphenyl and its homologues, tetrazooxydiphenyl-alkylethers, tetrazodioxydiphenyl-alkylethers, tetrazo-stilbene and tetrazoazo-benzene and its homologues, substantially as described.

3. The herein described method of making coloring matters which consists in producing coloring matters by the combination of one molecule of the tetrazoderivative of an aromatic para-diamido-compound with one molecule of the dioxynaphthoic monosulfoacid derived from alpha-oxynaphthoic disulfoacid ($OH.COOH.SO_3H.SO_3H=1.2.4.7$) and the subsequent combination of the intermediate product thus obtained with a sulfo-derivative of a naphtholic compound, such, for instance, as the monosulfo- and disulfo-acids of alpha and beta-naphthols, the mono-sulfo- and disulfo-acids of the oxynaphthols (dioxynaphthalenes), the monosulfo- and disulfo acids of amidonaphthols and the monosulfoacids of the carboxylicoxynaphthols (dioxynaphthoic monosulfoacids) substantially as described.

4. The new blue, tetrazoic coloring matter herein described, obtained with dianisidin and the dioxynaphthoic-monosulfo-acid derived from alpha-oxynaphthoic-disulfo acid ($OH.COOH.SO_3H.SO_3H=1.2.4.7$) the said coloring matter, when in a dry state, being a brown powder, with metallic luster readily soluble in water with a blue coloration, capable of dyeing unmordanted cotton, in an alkaline bath, a greenish blue color, and producing a greenish blue coloration when dissolved in concentrated sulfuric acid, as set forth.

In witness whereof I have hereunto signed my name in the presence of two subscribing witnesses.

CARL OSKAR MÜLLER.

Witnesses:
GEORGE GIFFORD,
AMAND RITTER.